United States Patent
Cai et al.

(10) Patent No.: US 9,749,805 B2
(45) Date of Patent: Aug. 29, 2017

(54) METHODS, WIRELESS DEVICE AND NETWORK NODE FOR MANAGING POSITIONING METHOD BASED ON PREDICTION

(71) Applicant: Telefonaktiebolaget LM Ericsson (publ), Stockholm (SE)

(72) Inventors: Xuejun Cai, Täby (SE); Jan Christoffersson, Luleå (SE); Shunliang Zhang, Beijing (CN); Vincent Huang, Sollentuna (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 14/917,642

(22) PCT Filed: Oct. 25, 2013

(86) PCT No.: PCT/SE2013/051248
§ 371 (c)(1),
(2) Date: Mar. 9, 2016

(87) PCT Pub. No.: WO2015/038046
PCT Pub. Date: Mar. 19, 2015

(65) Prior Publication Data
US 2016/0219409 A1  Jul. 28, 2016

Related U.S. Application Data

(60) Provisional application No. 61/877,307, filed on Sep. 13, 2013.

(51) Int. Cl.
*H04W 24/00* (2009.01)
*H04W 4/02* (2009.01)
(Continued)

(52) U.S. Cl.
CPC ............ *H04W 4/028* (2013.01); *G01S 5/0263* (2013.01); *G01S 19/48* (2013.01); *H04W 64/006* (2013.01)

(58) Field of Classification Search
CPC .................................................... H04W 4/028
See application file for complete search history.

(56) References Cited

U.S. PATENT DOCUMENTS 6,385,454 B1    5/2002  Bahl et al.
2004/0128066 A1*  7/2004  Kudo ................ G01C 21/3617
                                                   701/468

(Continued)

FOREIGN PATENT DOCUMENTS

EP    2 464 182 A2    6/2012

OTHER PUBLICATIONS

A Two-Layer Approach for Energy Efficiency in Mobile Location Sensing Applications by Yi-Yin Chang et al., 2012.
Bayesian Learning of Neural Networks for Mobile User Position Prediction by Sherif Akoush et al, 2007.

(Continued)

*Primary Examiner* — Justin Lee
(74) *Attorney, Agent, or Firm* — Baker Botts, LLP

(57) ABSTRACT

A method and a wireless device (110) for managing a positioning method based on prediction as well as a method and a network node (120) for managing mobility patterns for use by a wireless device (110) when performing a positioning method based on prediction are disclosed. The wireless device (110) performs mobility measurements relating to mobility of the wireless device (110). The wireless device (110) estimates a position of the wireless device (110) based on prediction by using the mobility measurements and a first intra-cell pattern. The wireless device (110) detects whether the wireless device (110) is on the first intra-cell pattern or on a second intra-cell pattern, when the estimated position has reached a checkpoint of the first intra-cell pattern. The (Continued)

network node (120) receives information about mobility patterns. The mobility patterns comprise intra-cell patterns of cells visited by the wireless device (110). The network node (120) identifies one or more checkpoints by finding a junction between at least two of the intra-cell patterns.

16 Claims, 9 Drawing Sheets

(51) Int. Cl.
*H04W 64/00* (2009.01)
*G01S 19/48* (2010.01)
*G01S 5/02* (2010.01)

(56) References Cited

U.S. PATENT DOCUMENTS

2012/0149400 A1* 6/2012 Paek ............... G01C 21/26
 455/457
2013/0053056 A1* 2/2013 Aggarwal ......... G01S 5/0263
 455/456.1

OTHER PUBLICATIONS 2012 12th International Conference on ITS Telecommunications; Destination-Aware Non-GPS Positioning using Predictive Contexts by Chih-Pei Yang, 2012.
2010 Asia-Pacific Conference on Wearable Computing Systems; Displacement Measurement Algorithm Using Handheld Device with Accelerometer by Tianhuang Chen et al., 2010.
Improving Wireless Network Performance Using Sensor Hints by Lenin Ravindranath et al., 2011.
Science AAAS; Limits of Predictability in Human Mobility by Chaoming Song et al.; Science 327, 1018, 2010.
International Search Report for International application No. PCT/SE2013/051248, Jan. 7, 2014.
Understanding individual human mobility patters by Marta C. Gonzalez et al.; vol. 453, Jun. 5, 2008.
PCT Written Opinion of the International Searching Authority for International application No. PCT/SE2013/051248, Jan. 7, 2014.
Evaluating location predictors with extensive Wi-Fi mobility data by Libo Song et al., 2004.
Supplementary European Search Report for Application No. EP 13 89 3500—Aug. 25, 2016.
Algorithms for Map-Aided Autonomous Indoor Pedestrian Positioning and Navigation by Ivan Spassov—Nov. 23, 2007.

* cited by examiner

METHODS, WIRELESS DEVICE AND NETWORK NODE FOR MANAGING POSITIONING METHOD BASED ON PREDICTION

PRIORITY

This nonprovisional application is a U.S. National Stage Filing under 35 U.S.C. §371 of International Patent Application Serial No. PCT/SE2013/051248 filed Oct. 25, 2013, and entitled "Methods, Wireless Device And Network Node For Managing Positioning Method Based On Prediction" which claims priority to U.S. Provisional Patent Application No. 61/877,307 filed Sep. 13, 2013, both of which are hereby incorporated by reference in their entirety.

TECHNICAL FIELD

Embodiments herein relate to wireless communication systems, such as telecommunication systems. In particular, a method and a wireless device for managing a positioning method based on prediction as well as a method and a network node for managing mobility patterns for use by a wireless device when performing a positioning method based on prediction are disclosed.

BACKGROUND

Many smartphone applications or services require position information, e.g., location based services including mobile advertisement, mobile social network and etc.

Hence, in today's modern mobile devices, two positioning functions are usually provided: Global Positioning System (GPS) function and network based positioning function, such as cell-ID or WiFi Access Point (AP) based positioning functions. WiFi is a technology that allows electronic devices to exchange data or connect to Internet wirelessly using radio waves.

A GPS receiver calculates its position by precisely determining timing of signals sent by a set of GPS satellites that transmits those signals. The GPS receiver, when comprised in a mobile device, is usually accurate to within 10-20 meters on an average.

Some network based positioning functions use cell identification (Cell-ID) of a cellular network and a Media Access Control (MAC) address, e.g. according to an 802.11 AP MAC address, to estimate a position of a mobile device. A network based positioning function may use a location of a base station, comprised in a cellular network, as an estimate of the position of the mobile device. It shall be noted that the position of the base station is already known and stored in a database that may be managed by the cellular network. The accuracy achieved with this network based positioning function relies on the cell size which can be up to several km in the cellular network. Other network based positioning functions, such as WiFi positioning, applies a similar approach as the network based positioning function, which uses cell ID as described above. Instead of the positions of the base stations of the cellular network, geographical information about positions of WiFi APs are kept in a database which can be looked up for making an estimation of a position for a mobile device that is connected to an WiFi AP.

Large scale statistical studies, such as Gonzalez, M. C., Hidalgo, C. A., Barabasi, A. L., "Understanding individual human mobility patterns". Nature 453(7196), 2008 and Song, C., Qu, Z., Blumm, N., Barabsi, A. L.: "Limits of predictability in human mobility", Science 327(5968), 2010, have shown that most people have regular daily routines of moving and traveling. This provides an opportunity for predicting and estimating a person's movements, i.e. a mobile device that the person carries, given that this person has been observed for some time.

Although several positioning systems are already available as mentioned above, they have some inherent limitations. Network based positioning functions are highly energy efficient, but are often prone to errors as high as several kilometers. Disadvantageously, an accuracy of several kilometers may be insufficient for some location based applications that may require more accurate estimation of the position of the mobile device.

The GPS function mentioned above provides good accuracy, but it is also well known that GPS receivers are very power-consuming. Therefore, keeping the GPS receiver activated continuously would normally drain a battery of the mobile device quickly, even in the absence of any other activities, such as cellular network transmissions. This is an obstacle towards all-day usage of location based services in mobile devices.

There are already some existing efforts that attempt to reduce the energy consumption for positioning functions in mobile devices. In EP2464182 A2, a method for navigation based on a Cell-ID aided positioning system is disclosed. A mobile user's current position is determined based stored route information. The route information includes recorded sequences of Cell-IDs and GPS information. A length of the recorded sequence of cell-IDs is fixed, for example 10. Then, a current sequence of cell-IDs is identified. A length of the current sequence of cell-IDs is also fixed, but shorter than the recorded sequences of cell-ID, for example 5. Then, the current sequence of cell-IDs is matched against the recorded sequence of Cell-IDs. If there is a match, temporal interpolation and the GPS information is used to estimate the current position.

A problem with known positioning methods based on prediction is that accuracy is not high enough for some applications.

SUMMARY

An object may be to improve accuracy of prediction based positioning methods in a telecommunication system.

According to an aspect, the object is achieved by a method, performed by a wireless device, for managing a positioning method based on prediction. The wireless device performs mobility measurements relating to mobility of the wireless device. The wireless device estimates a position of the wireless device based on prediction by using the mobility measurements and a first intra-cell pattern, which first intra-cell pattern indicates positions, such as GPS coordinates, within a cell. The wireless device is associated with the cell. Furthermore, the wireless device detects whether the wireless device is on the first intra-cell pattern or on the second intra-cell pattern, when the estimated position has reached a checkpoint of the first intra-cell pattern. The checkpoint identifies a junction between the first intra-cell pattern and a second intra-cell pattern for indicating positions within the cell.

According to another aspect, the object is achieved by a wireless device configured to manage a positioning method based on prediction. The wireless device comprises a processing circuit configured to perform mobility measurements relating to mobility of the wireless device, and to estimate a position of the wireless device based on prediction by using the mobility measurements and a first intra-cell pattern, which first intra-cell pattern indicates positions within a cell. The wireless device is associated with the cell. Furthermore, the processing circuit is configured to detect whether the wireless device is on the first intra-cell pattern or on the second intra-cell pattern, when the estimated position has reached a checkpoint of the first intra-cell pattern. The checkpoint identifies a junction between the first intra-cell pattern and a second intra-cell pattern for indicating positions within the cell.

According to a further aspect, the object is achieved by method, performed by a network node, for use by a wireless device when performing a positioning method based on prediction. The network node receives information about mobility patterns. The mobility patterns comprise intra-cell patterns of cells visited by the wireless device. The network node analyses the mobility patterns according to the received information about mobility pattern. The analyzing comprises identifying one or more checkpoints by finding a junction between at least two of the intra-cell patterns.

According to a still further aspect, the object is achieved by a network node configured to manage mobility patterns for use by a wireless device when performing a positioning method based on prediction. The network node comprises a processing circuit configured to receive information about mobility patterns. The mobility patterns comprise intra-cell patterns of cells visited by the wireless device. Moreover, the processing circuit is configured to analyze the mobility pattern according to the received information about mobility pattern. The analyzing comprises identifying one or more checkpoints by finding a junction between at least two the intra-cell patterns.

According to embodiments herein an energy efficient positioning mechanism in a mobile device that takes user's mobility history into consideration is described and proposed.

The term "inter-cell pattern" may refer to a sequence of cell identifiers, e.g. cell IDs. The sequence of cell identifiers may be associated to information about when and how long the wireless device sojourns within a cell associated to a cell identifier of the sequence. Sometimes the term "inter-cell trace" is used interchangeably. However, the term "inter-cell location trace" excludes the information about when and how long the wireless device sojourns within a cell. When and how long the wireless device sojourns may be included in an "inter-cell time trace".

Similarly, the term "intra-cell pattern" may refer to a sequence of points indicating time and position of the wireless device within a cell. Points may refer to spatial and/or temporal points. Sometimes the term "intra-cell trace" is used interchangeably. However, the term "intra-cell location trace" excludes temporal information indicating time between positions of the intra-cell trace. The temporal information may be included in an "intra-cell time trace".

The term "mobility pattern", or "history/historical mobility pattern" may include "inter-cell pattern" and "intra-cell pattern".

According to one exemplifying embodiment, the wireless device predicts, or estimates, a position of the wireless device based on an intra-cell pattern. The intra-cell pattern may be associated to a cell in which the wireless currently is located. As an example, the intra-cell pattern may comprise an intra-cell location trace, e.g. a set of GPS coordinates, and possibly also a corresponding intra-cell time trace. The set of GPS coordinates, which may have been recorded in advance, may indicate historical movements of the wireless device. The intra-cell time trace may indicate time interval between e.g. GPS coordinates of the intra-cell location trace. A further intra-cell pattern may be associated with the cell. The further intra-cell pattern may create a junction at some point of the initially mentioned intra-cell pattern. At a checkpoint, e.g. a location/position possibly also at a specific time, the wireless device may identify which of the initially mentioned intra-cell pattern and the further intra-cell pattern, the wireless device is currently on. The checkpoint may thus be located after the junction, e.g. after in time according to the initially mentioned intra-cell pattern.

When the estimated position, as initially mentioned in the preceding paragraph, is at or past the checkpoint, the wireless device may obtain a further estimate of the mobility of the wireless device. The further estimate of the mobility, e.g. information about position and/or relative movements or the like, may be obtained by e.g. by turning on a GPS unit, comprised in the wireless device. The wireless device may establish on which of the further intra-cell pattern and the intra-cell pattern the wireless device is on, or follows. The establishment may be performed by comparing the further estimate of the mobility with the further intra-cell pattern, e.g. positions or points of the further intra-cell pattern.

Hence, an accurate method to estimate a wireless device's position based on its intra-cell pattern is achieved.

Advantageously, some embodiments provide an energy efficient positioning mechanism when compared to pure GPS based positioning. The embodiments herein are energy efficient, because the GPS functionality, which consumes considerable amounts of energy, may be turned off. While at the same time, the embodiments still provide better accuracy than network based positioning. The proposed embodiments have been implemented in Android phone. Performance evaluation has shown the effectiveness of the embodiments herein.

When compared to known solutions, such as in the above mentioned EP2464182, some embodiments herein have several advantages.

An advantage, according to some embodiments, is that by introducing multiple intra-cell traces and checkpoints. With multiple intra-cell traces, it can distinguish different user movement routes in a cell, and at the checkpoints deviations from the predicted movement, or mobility pattern, of the wireless device in relation estimated true movement may be detected at an early phase. This greatly improves the prediction accuracy within a cell and usefulness of the predicted movement, since the deviations may be accounted for when detected. In contrast, previously mentioned EP2464182 only turns GPS on when the time spent in the current Cell-ID since the entrance into that Cell-ID far exceeds the departure time of that Cell-ID as given by the historical information about the movement.

In some embodiments, second-order Markov model is used to predict the wireless device's next cell and to determine if the wireless device follows its history mobility pattern. This model uses probability transition matrix to make the prediction, which need not maintain all history cell ID sequence. Therefore, it is more efficient than EP2464182 from a computing and memory space perspective. In addition, as mentioned before, the length of cell ID sequence in EP2464182 cannot be too short, while a second-order Markov model only requires a length of the sequence of cell identifiers (ID) to be two, i.e. the sequence includes at least two cell IDs. As a result, dynamic changes of cell pattern, i.e. mobility pattern, may be better reflected by such short, i.e. length of two, sequences of cell identifiers, or cell identification sequences.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
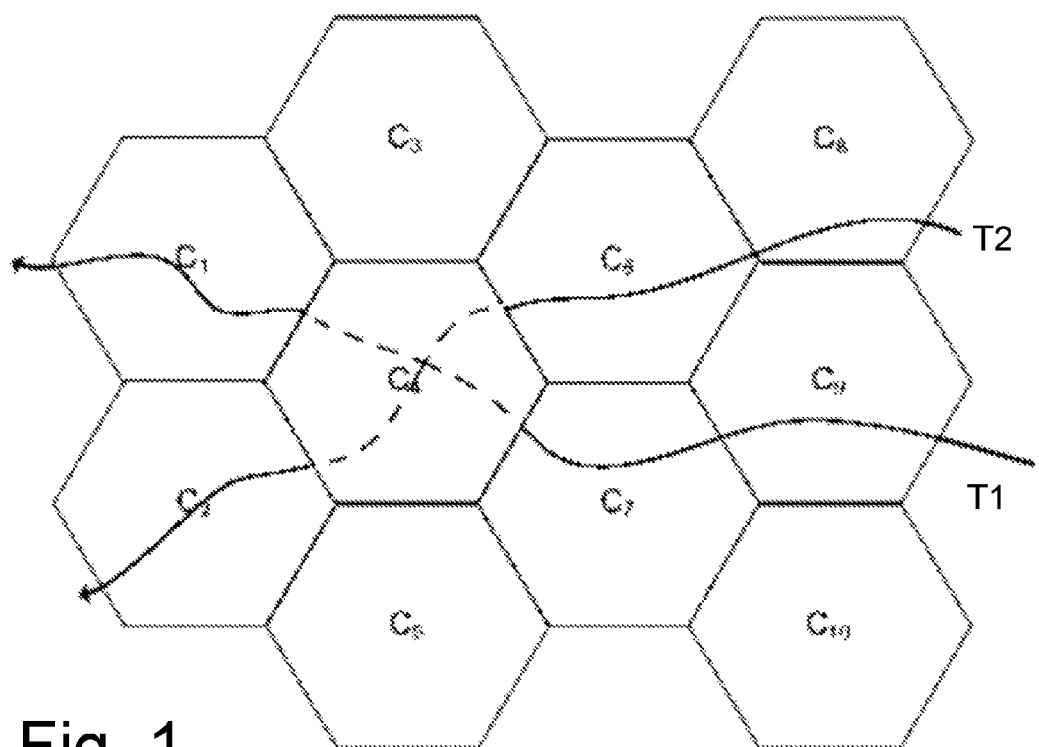
FIG. 1 illustrates a number of cells and a wireless device's mobility pattern through those cells.

In order to better appreciate the benefits and advantages of the embodiments herein, problems with existing solutions will be analyzed here.

Again referring to EP2464182 A2, it is noted that the method presented therein can reduce energy consumption of the wireless device by using recorded history information and interpolation, there are however several disadvantages for this method.

Firstly, the position estimation within a cell is not accurate enough. Interpolation based on history points is used to calculate the current position within a cell, i.e. depending on time since entrance into a cell a position is predicted.

Secondly, there are issues with the prediction of current cell, which is both memory and processor heavy due to the long cell ID sequences that are required for matching purposes.

This known method cannot detect when mobile user changes its normal route within the same cell. Only if the time spent in the current cell-ID since the entrance into that cell-ID far exceeds the departure time of that cell-ID from the history, then it turns GPS functionality on to get current accuracy position.

As mentioned in the summary section, a general problem with prediction based methods is how to obtain high enough accuracy. Moreover, as explained above, it has been realized that it is desired to identify situations when this high accuracy can be obtained. Since a prediction algorithm may be less accurate at some points in time, it is especially advantageous to be able to distinguish situations, when and/or where the algorithm works and when and/or where it does not. In situations, in which it is not possible to obtain high prediction accuracy, the predictions may be turned off until accurate predictions can be obtained again. In order for a prediction algorithm to be useful in a practical situation this is advantageous.

Throughout the following description similar reference numerals have been used to denote similar elements, units, modules, circuits, nodes, parts, items or features, when applicable. In the Figures, features that appear in some embodiments are indicated by dashed lines.

FIG. 1 shows that a user's, e.g. a wireless device's, history mobility pattern may be organized into two levels. A first level is an inter-cell pattern of mobility of the wireless device in cell level. The inter-cell pattern may be exemplified by an Inter-cell Trace. A second level is an intra-cell pattern of mobility of the wireless device within one cell. The intra-cell pattern may be exemplified by an intra-cell trace.

The Inter-cell trace may be represented as a sequence comprising cell ID of visited cells, e.g. cell $C_9 C_7 C_4 C_1$ in FIG. 1. The sequence is shown as a first trace T1 and represents that the wireless device 100 has visited cell 9, 7, 4, and 1 in time sequence. Notably, $C_i$, (i denotes a particular cell) represents respective cell identifiers, cell IDs.

A second trace T2 illustrates mobility trace $C_8 C_6 C_4 C_2$. More generally, the mobility pattern may thus comprise a first and second inter-cell pattern given by the first and second traces and corresponding information about when and how long the wireless device sojourned in the respective cells of each of the traces T1, T2.

Continuing with reference to FIG. 1, for each cell, there are one or more intra-cell traces associated with the respective cell. Each intra-cell trace comprises a recorded GPS coordinate sequence, for example, in cell $C_4$. The dashed lines in cell $C_4$ indicate the internal mobility trace in this cell, i.e. an intra-cell pattern or intra-cell trace. As cell-ID based positioning consumes much less energy when compared to GPS based positioning, it's proposed to firstly use a recorded intra-cell trace to decide if a user is following history mobility pattern. As mentioned above, previous studies have shown user's mobility is highly predictable. Therefore it's reasonable to assume that if the user follows history mobility pattern in cell level, i.e. inter-cell pattern, then it will highly probably also follow its history trace within the cell, e.g. an intra-cell pattern.

Figure 2:
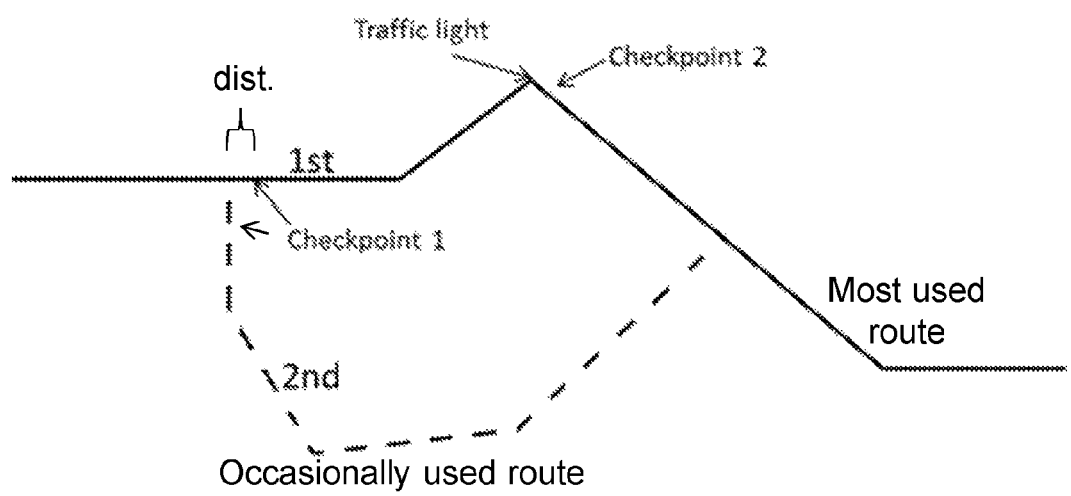
FIG. 2 illustrates two mobility patterns and two checkpoints.

An example is shown in FIG. 2, which depicts two example routes, or example mobility patterns, and checkpoints. Assume that the solid curve is the typical (most used) route, e.g. intra-cell pattern, and that the dashed curve is a route that is occasionally used. If a check is done when the wireless device is predicted to be at Checkpoint 1, it can be deduced which of the two routes that the wireless device has taken. Notably, the Checkpoint 1 may be located a distance, indicated by dist., after a junction, where the dashed line connects to the solid line in the left portion of the Figure. For example a GPS position measurement may be performed when the wireless device is on or at the Checkpoint 1. A result of the GPS position measurement may indicate which of the routes, e.g. $1^{st}$ route—most used or $2^{nd}$ route—occasionally used, the wireless device is in fact following. This has the advantage that only small prediction errors are obtained when the wireless device takes the occasional $2^{nd}$ route, since intra-cell pattern for the $2^{nd}$ route is used when predicting the position of the wireless device. A second checkpoint, denoted 'Checkpoint 2', is when and/or where the wireless device is predicted to have passed e.g. a traffic light. This will discover if the wireless device is delayed at the traffic light and adjustment of the predictions can be made if this is the case.

Figure 3:
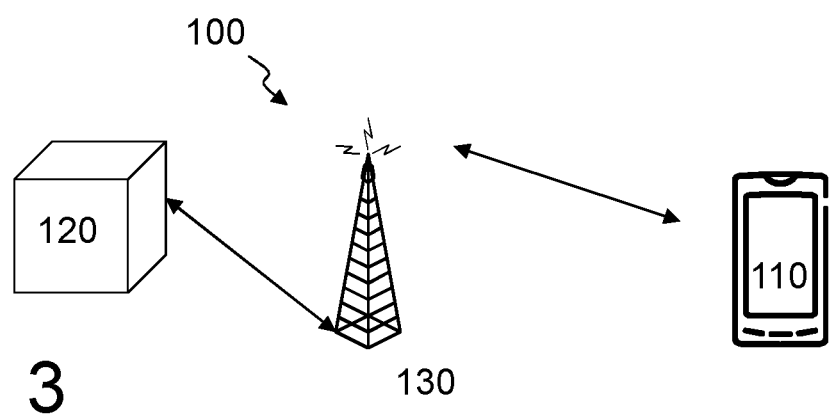
FIG. 3 is a schematic overview of an exemplifying radio communication system in which embodiments herein may be implemented.

FIG. 3 depicts an exemplifying radio communications system 100 in which embodiments herein may be implemented. In this example, the radio communications system 100 is a Long Term Evolution (LTE) system. In other examples, the radio communication system may be any 3GPP cellular communication system, such as a Wideband Code Division Multiple Access (WCDMA) network, a Global System for Mobile communication (GSM network) or the like.

The radio communication system 100 comprises a radio network node 130. As used herein, the term "radio network node" may refer to an evolved Node B (eNB), a control node controlling one or more Remote Radio Units (RRUs), a radio base station, a base station, an access point or the like.

The radio network node 131 may operate a cell (not shown) and a further cell (not shown). In other examples, the cells may be operated by different radio network nodes.

Furthermore, the radio communication system 100 comprises a network node 120 for handling mobility patterns.

Furthermore, a wireless device 110 is located in the cell, or a source cell. This means that the wireless device 110 is in the vicinity of the radio network node 130. The wireless device 110 may comprise a GPS unit.

As used herein, the term "wireless device" may refer to a user equipment, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. It may here also be noted that the term "user" may refer to the wireless device.

According to some embodiments herein, it is proposed to utilize the user's history mobility pattern, or mobility profile, to predict the user's current location. According to embodiments herein, high power GPS based positioning methods is not used, when the wireless device 110 follows its history mobility pattern. Instead, the current location is predicted according to its history mobility pattern, e.g. using both inter-cell pattern and intra-cell pattern. When mobile user's movement deviates from its history mobility pattern, the wireless device may for example retrieve a current true position by turning on and using the GPS.

A deviation from the history mobility pattern may also be detected by means of one or more mobility sensors. The wireless device, or user equipment, may comprise one or more mobility sensors, or the wireless device may be connected to one or more mobility sensors, for example by a wired or wireless connection. A mobility sensor may be an accelerometer, a step-counter, an altimeter, a gyroscope, a compass or the like. It is beneficial when the mobility sensor consumes small amounts of energy, for example in comparison to a GPS unit.

Figure 4:
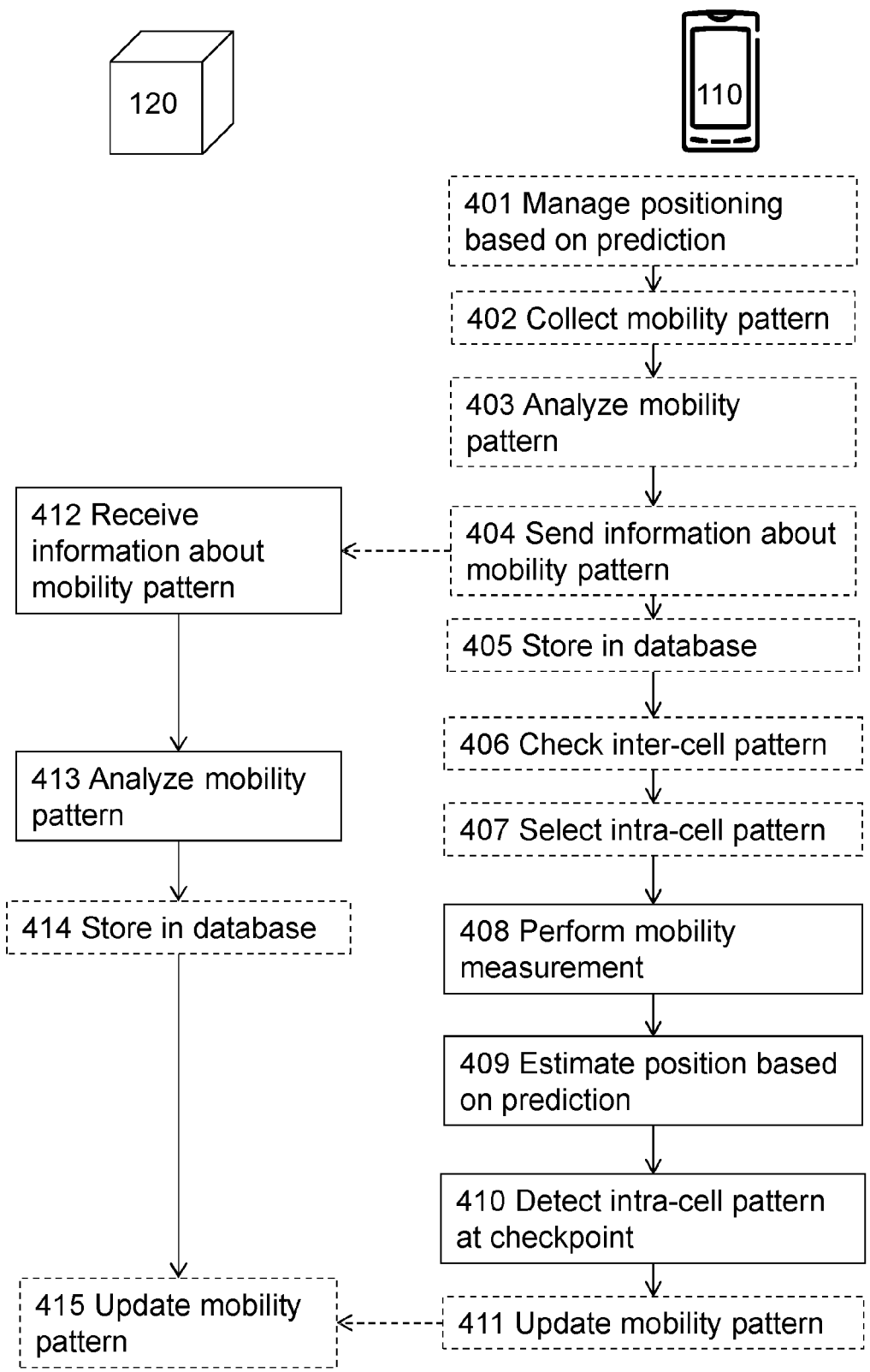
FIG. 4 is a schematic, combined signaling scheme and flowchart illustrating embodiments of the methods when performed in the radio communication system according to FIG. 3.

FIG. 4 illustrates an exemplifying method for managing a positioning method based on prediction when implemented in the radio communication system 100 of FIG. 3. The wireless device 110 performs a method for managing a positioning method based on prediction. The network node 120 performs a method for managing mobility patterns for use by the wireless device 110 when performing a positioning method based on prediction.

The following actions may be performed in any suitable order. For simplicity, the actions in the wireless device are described first. Then, the actions in the network node are described.

Action 401

The wireless device may manage a positioning method based on prediction, for example if an application utilizing a location based service is running in the wireless device 110. The application may require positioning information, e.g. estimates of the position of the wireless device at regular or irregular intervals, such as time interval or distance intervals. Thus, the wireless device 110 may need to provide positioning information and manage positioning based on prediction, for example in order to reduce power consumption.

A database comprising information about historical/history mobility patterns of the wireless device may be accessible by the wireless device. The database may reside in the wireless device or in the network, such as a database node which may be reached via a radio network node, such as a base station. The database may be referred to as a mobility pattern database. Again as an example, the database may comprise mobility patterns. The mobility patterns may comprise at least one inter-cell pattern, wherein said at least one inter-cell pattern comprises at least a first intra-cell pattern.

Action 402

In order to build the database, the wireless device 110 may collect mobility patterns of the wireless device 110 by identifying inter-cell patterns and intra-cell patterns. As an example, the wireless device 110 may record the information about historical mobility patterns of the wireless device. Next, the information may consequently be stored in the database, see also action 405 below. As mentioned, the mobility pattern may comprise the inter-cell patterns and the intra-cell patterns.

Action 403

In order to extract relevant information about one or more checkpoints, the wireless device 110 may analyze the collected mobility patterns by finding one or more junctions among the intra-cell patterns. The one or more junctions may be associated with each of the one or more checkpoints. This means for example that the junction may be near, or at, a check point.

In some more detail, the information about historical mobility patterns may be analyzed in order to identify at least one checkpoint and its location. A checkpoint may be identified by finding a junction in the intra-cell patterns, e.g. a point where the intra-cell pattern diverges, in time and/or position, along two different intra-cell patterns. The checkpoint may be set at a point, e.g. a distance dist as shown in FIG. 2, after the identified junction in order to facilitate identification of a chosen route, or intra-cell pattern.

As an example, a second intra-cell pattern follows subsequently after the first intra-cell pattern and a third intra-cell patterns follows subsequently after the first intra-cell pattern. Hence, at an end of the first intra-cell pattern a junction is created. At the junction, the wireless device 110 may continue along the second or the third intra-cell pattern. The junction may be associated with a checkpoint. At the checkpoint, the wireless device may perform an action as described below. Alternatively, the junction may be expressed as that the first intra-cell pattern includes the third intra-cell pattern and the second intra-cell pattern connects to a point at the first intra-cell pattern. At the point, a junction is thus created. In the previous example in this paragraph, the point may correspond to the end of the first intra-cell pattern.

The analysis of the information about historical mobility patterns may be performed by the wireless device or a node for handling information about mobility patterns. The node for handling information about mobility patterns may be comprised in the network.

Action 404

In order for the network node 120 to be able to use the collected mobility pattern in e.g. action 413, 414 and/or 415, the wireless device 110 may send the collected mobility patterns to the network node 120.

Action 405

Figure 10:
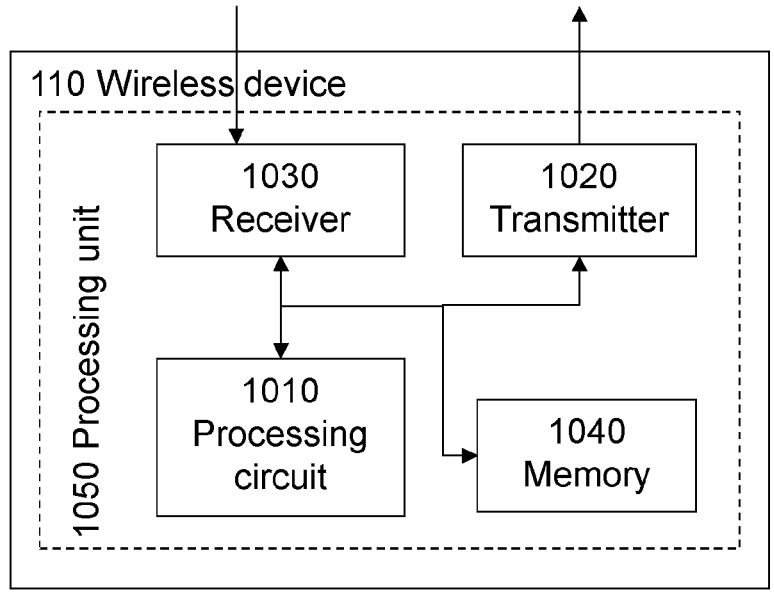
FIG. 10 is a block diagram illustrating embodiments of the wireless device.

Now that the mobility pattern may have been analyzed, the mobility pattern may be stored in the database. In this example, the wireless device 110 comprises, e.g. handles, the database. Thus, as shown in FIG. 10, a memory may comprise the database.

Action 406

The wireless device may be handed over, due to a so called hand-over, to a target cell from the source cell (not shown) by the radio network node 130. The term "hand-over" has its established meaning within the field of mobile telecommunications.

The wireless device 110 may follow an inter-cell pattern, which comprises the source cell.

When the wireless device 110 may enter the target cell, the wireless device 110 may determine whether or not the wireless device follows its predicted inter-cell pattern. This means that the wireless device 110 may check the inter-cell pattern by comparing a first cell identifier of the target cell to a second cell identifier for a predicted subsequent cell according to the inter-cell pattern. As an example, when a first cell identifier of the target cell is equal to a second cell identifier for a predicted subsequent cell (subsequent to the source cell), then it may be concluded that the wireless device follows its predicted inter-cell pattern. In this manner, the wireless device checks the inter-cell pattern.

Action 407

When e.g. action 406 has been performed, the wireless device 110 may select the intra-cell pattern based on the source cell and a further source cell, which was visited, by the wireless device 110, prior to the source cell. This means that the wireless device 110 may select an intra-cell pattern, e.g. any first intra-cell pattern, corresponding to, or associated with, the target cell and, at least parts of, the predicted (current) inter-cell pattern. The selection of intra-cell pattern is described in section "Intra-cell traces and Checkpoint identification" below.

Action 408

The wireless device 110 performs mobility measurements relating to mobility of the wireless device 110, e.g. by use of one or more mobility sensors. In addition or alternatively, the mobility measurements may include measurement of time elapsed since last predicted position.

The wireless device may perform the mobility measurement by activating, or reading values from, one or more mobility sensors, and/or measurement of time elapsed since a preceding position estimation.

Action 409

After action 408, the wireless device 110 estimates a position of the wireless device 110 based on prediction by using the mobility measurements and a first intra-cell pattern, which first intra-cell pattern indicates positions within a cell. The wireless device 110 is associated with the cell. As an example, the wireless device 110 may be served by the radio network node 130 operating the cell. However, in other examples the wireless device 110 may be out-of-coverage, e.g. not presently served by the radio network node 130, if the wireless device 110 is travelling in e.g. a tunnel which prevents radio transmission between the radio network node 130 and the wireless device 110. The first intra-cell pattern may be the selected intra-cell pattern of action 407.

Action 410

When the estimated position indicates that a checkpoint of the intra-cell pattern has been reached, the wireless device 110 detects which intra-cell pattern the wireless device is on, or follows. The wireless device 110 detects whether it is on the first, second or third intra-cell pattern.

As mentioned, the checkpoint identifies a junction between the first intra-cell pattern and a second intra-cell pattern for indicating positions within the cell. This means that the junction may be after an actual intersection between two intra-cell patterns in order to set the checkpoint where detection of which intra-cell pattern is followed by the wireless device 110 is facilitated.

Expressed differently, the wireless device may at the checkpoint check which of the first, second and third intra-cell patterns to use when estimating the position of the wireless device. In some examples, two intra-cell patterns that only differ with respect to their intra-cell time traces may have defined a checkpoint. This may for example occur at a traffic light. Hence, a selection of a different intra-cell pattern may be implemented as a delay, or shift, of a current intra-cell pattern. An amount of the delay may be based on mobility measurements obtained at the checkpoint.

In further examples, when it has been determined that the checkpoint has been reached, the detection of which route the wireless device is on, or which route the wireless device follows, may be detected in the following manners.

As an example, the wireless device may perform the detection by means of GPS measurements. For example, the wireless device may use the GPS unit to obtain a true, or at least very accurate, position. Then the true position may indicate which of the routes the wireless device follows.

As another example, the wireless device may perform the detection by means of mobility measurements performed by one or more mobility sensors. Hence, the wireless device may use one or more mobility sensors to detect which route the wireless device is on. This may be advantageous when the wireless device is located in a tunnel where the GPS unit may not be useable. In a schematic example, the predicted position may be based on time. Thus, after a certain time it may be determined that the checkpoint has been reached. It shall here be said that the predicted position may in other examples be based on time and/or mobility measurements, but for simplicity of this example only time is considered.

Then, for example one or more measurements, performed in a time interval preceding the detection of that the checkpoint has been reached, may be used to detect which route the wireless device follows. In this example, such measurements may be performed by the mobility sensor, such as gyroscope or accelerometer. In case such measurements indicate that the wireless device has made a turn, it may be inferred that the second route has been chosen by the user of the wireless device.

Action 411

The wireless device 110 may, e.g. in case of GPS measurements, update the mobility pattern by adding the collected mobility patterns to a database comprising mobility patterns. Expressed differently, the wireless device 110 may update the mobility pattern database by adding information from the GPS measurements, such as GPS coordinates.

If the database resides in the network, the required information, such a GPS coordinates, may be sent, by the wireless device 110, to the network node 120. The required information may be an example of the collected mobility patterns.

Otherwise, the wireless device may store the information from the GPS measurements in a local database, e.g. as in action 405.

The mobility pattern database may be re-analysed in response to the updating by addition of information from the GPS measurements.

The re-analysis may be performed by the wireless device 110 or the network node 120. Hence, sometimes the wireless device may send information about newly identified checkpoints to the network node 120.

Action 412

The network node 120 receives information about mobility patterns. The mobility patterns comprise intra-cell patterns of cells visited by the wireless device 110.

Action 413

The network node 120 analyses the mobility patterns according to the received information about mobility pattern. The analyzing comprises identifying one or more checkpoints by finding a junction between at least two of the intra-cell patterns.

Action 414

The network node 120 may store the mobility pattern, including the identified checkpoints, in a database. The database may be accessed by the network node 120.

Action 415

The network node 120 may update the mobility pattern, e.g. store and/or re-analyze the mobility patterns to find checkpoints.

Throughout the present specification, GPS unit and GPS measurements is meant to indicate one practical example of an accurate and reliable positioning method. There exist many other positioning methods that more accurate than purely Cell ID based positioning, e.g. positioning methods based on Cell ID and Round Trip Time (RTT) and OTDOA (Observed Time Difference Of Arrival) and many more. Hence, as a general observation the solution presented herein may be applied while using any of these aforementioned positioning methods (or other positioning methods) instead of, or as a complement to the use of GPS as in the examples herein.

Hence, according to some embodiments, a first positioning method based on prediction is enhanced by means of invoking a second positioning method which may be more accurate than the first positioning method, or by means of invoking measurements from one or more mobility sensors.

Figure 5:
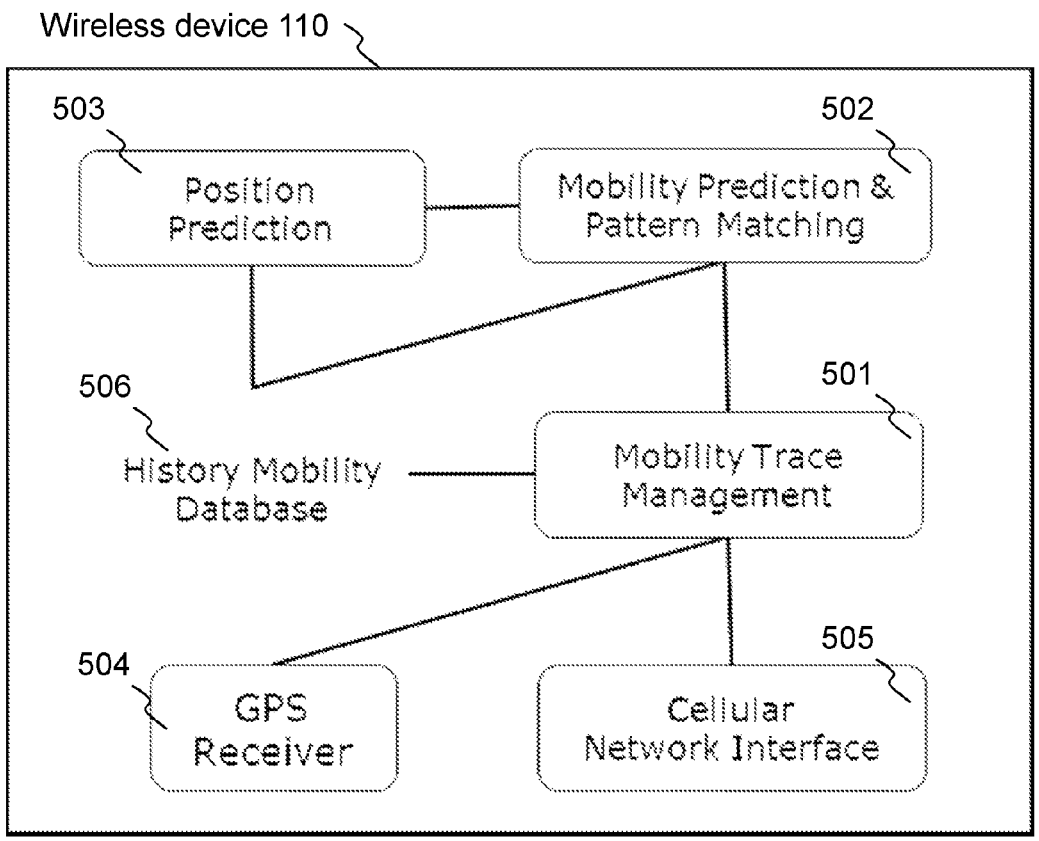
FIG. 5 is a block diagram illustrating a system architecture according to some embodiments.

An energy efficient positioning mechanism, according to embodiments herein may be implemented in the wireless device 110 as illustrated in FIG. 5 which comprises several parts: mobility trace management 501, mobility prediction & pattern matching 502, and position prediction 503.

In this Figure, the GPS unit, or GPS receiver 504 of the wireless device 110 is shown. Moreover, a cellular network interface 505 is shown. The wireless device 110 may also comprise, or have access to a database including information about mobility patters, e.g. a history mobility database 506.

Mobility trace management, e.g. in a history mobility management module comprised in the wireless device, may be used to gather data which is processed for use by the prediction algorithm. It records the user's trace using both GPS and cell information. In an initial period, the collected data may be only used for training purpose, after that, the collected data may be used for actual positioning and may also be used as training data continuously. After processing the collected history information may be stored with specified format for future pattern matching and positioning. The history trace, or mobility pattern, may comprise two parts: Inter-cell trace and Intra-cell trace. When building Inter-cell trace, some cells may be filtered out according to pre-defined criteria, for example, if the wireless device visits a cell in very short time, e.g., a few seconds, then cell may be excluded from the Inter-cell trace for simplicity.

The historical intra-cell traces may also be examined to determine points or places where the predictions have a higher probability to be erroneous. A typical example is after a traffic light for users travelling by car or bus. Traffic lights will relatively often have a large impact on the speed of the user. The difference between if a user must stop at the light compared to if he can drive straight through will result in prediction errors of several hundred meters. Another example is when there are several possible routes which the user may take. For example, the user may sometimes wish to avoid places where the traffic jams or he will take a detour to the grocery store a few times a week on his way home from work. This means that at some point(s) he will take an alternative route. If this is not accounted for in the prediction algorithm, it may cause erroneous predictions by several hundred meters or even kilometers. Identification of these points, herein referred to as checkpoints, may therefore be of vital importance for the accuracy and usefulness of the prediction algorithm. The points may be automatically detected in the historical traces.

Without using checkpoints, the accuracy of the intra-cell predictions may be prone to large errors when there are deviations from the typical user movement. This would make the algorithm less useful in practice.

Checkpoints may also be obtained from an external database. The external database may include information about locations of traffic lights, road construction sites and the like.

When a user is entering into a new cell, the mobility prediction and pattern matching part may check if this cell is the same as the one predicted from the history profile when the user was in the last visited cell. If yes, it may be inferred that the user is following its historical pattern, and then current user location (e.g., latitude and longitude) may be estimated from the historical intra-cell trace. If not, it may be inferred that the user is currently out of its historical pattern and start of GPS functionality may be triggered in order to retrieve a more accurate position.

A function of positioning prediction may be used to predict the current location if the mobile user is following the historical pattern. The historical, stored intra-cell trace and predicted cell stay time may be used for such estimation.

In sections "mobility trace management", "mobility prediction & pattern matching" and "position prediction" in FIG. 8 below, more detailed information is provided.

Figure 6:
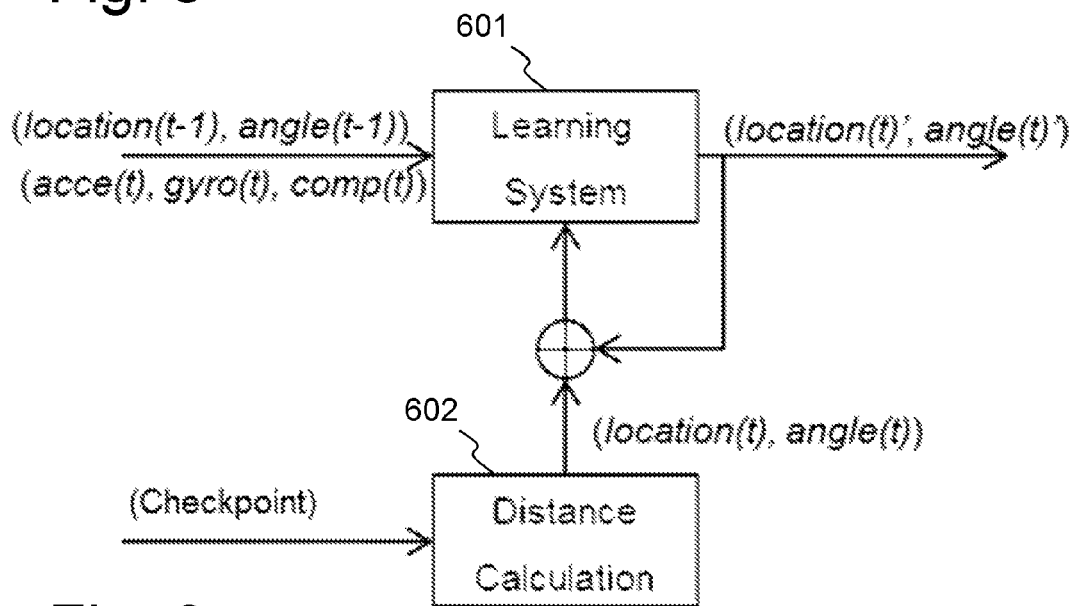
FIG. 6 is a block diagram illustrating system functions.

FIG. 6 is a block diagram illustrating system functions. The system composes a learning system 601 either on the wireless device or on a remote server, such as the network node 120. Generally, FIG. 6 shows a training procedure of the learning system 601. During the training procedure, a GPS of the wireless device 110 is on to measure speed and direction of the wireless device 110 during traveling. Using sensory measurements as inputs to the training procedure, the learning system 601 may be trained to identify if the wireless device 110 has reached/passed a checkpoint. The learning system 601 can also be used to identify which path the wireless device 110 is on, or at, from the sensory measurements.

In more detail, the learning system 601 may be a neural network or dynamic Bayesian Network. Inputs to the learning system 601 may be previous location location(t−1) and previous angle angle(t−1) of the wireless device 110 as well as mobility sensor measurements acce(t), gyro(t), comp(t), wherein acce(t), gyro(t) and comp(t) are acceleration, value of gyro and direction according to a compass, respectively. Angle may refer to a direction in which the wireless device 110 is moving. Output from the learning system 601 is a predicted current location location(t)' and a predicted current angle angle(t)' of the wireless device. The system does not need to be trained offline and can be trained in real time. Checkpoints may be placed based on information from a database or directly from the interpretation of the mobility pattern. For example, the location and speed can be recorded when GPS is enabled. A distance calculation function 602 can thus calculate a real location location(t) and a real angle angle(t) of the wireless device 110. The real calculated information, e.g. the real location and angle, and the predicted information, e.g. the predicted current location and angle, are feedback to the learning system 601 to train the learning system 601 in real time. The checkpoints do not need to be active all the time. For example, a checkpoint that has been defined due to traffic jams need probably only be active during so called rush-hours, e.g. in the morning and in the evening.

Figure 7:
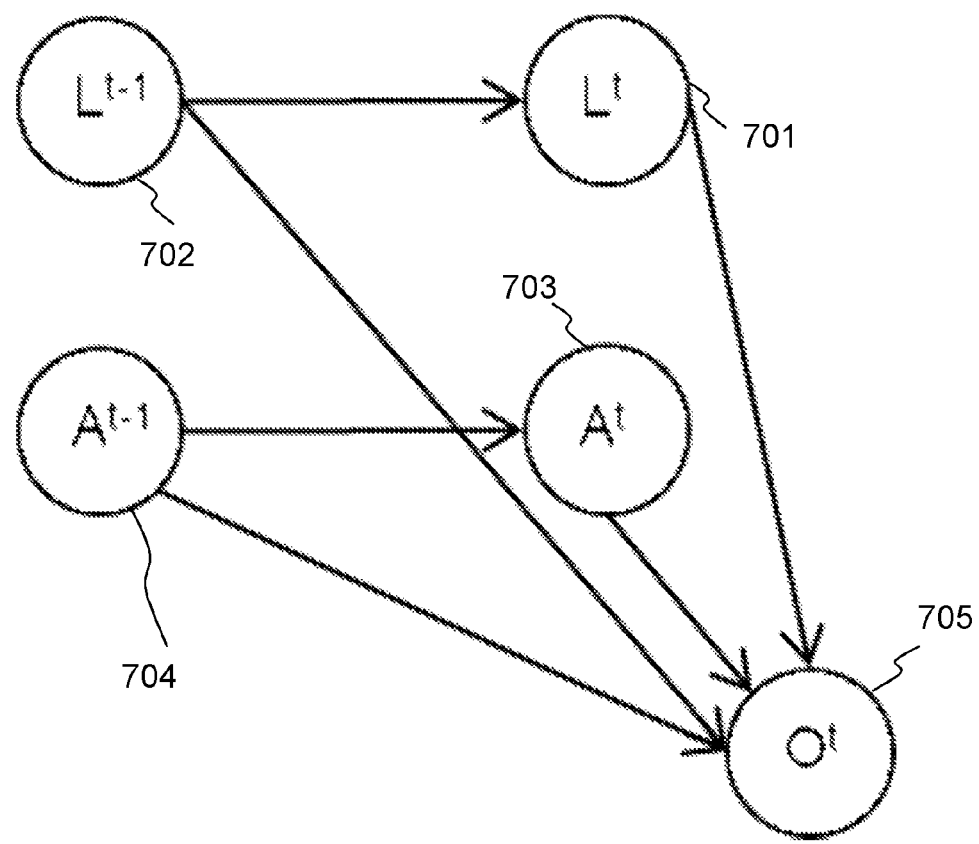
FIG. 7 is a block diagram illustrating an exemplifying Bayesian network which may be applied in some embodiments.

With reference to FIG. 7, a proposed improved Bayesian Network is illustrated in a simplified view. Generally, FIG. 7 is an example of location prediction using the improved Bayesian Network. Speed and direction of the wireless device 110 is determined using sensory measurement at a check point. By identifying the mobility pattern, it can be decided whether the wireless device 110 has reached a check point. Alternatively or additionally, it can be decided which path, or intra-cell trace, the wireless device 110 is on.

In more detail, with this Bayesian Network, a new location 701 may depend on a previous location 702 and a new angle 703 depends on a previous angle 704. O(t) 705 is an observation of sensor readings, which includes one or more mobility sensors. The sensor readings depend on both new and previous locations and new and previous angles.

Instead of calculation moving distance purely from acceleration, which can introduce large error even with small variations, a supervised learning system is used. In the supervised learning system, the models to be used may be specified, for example, models for human movement, or walking movement, etc. to control the accuracy of the outputs.

Figure 8:
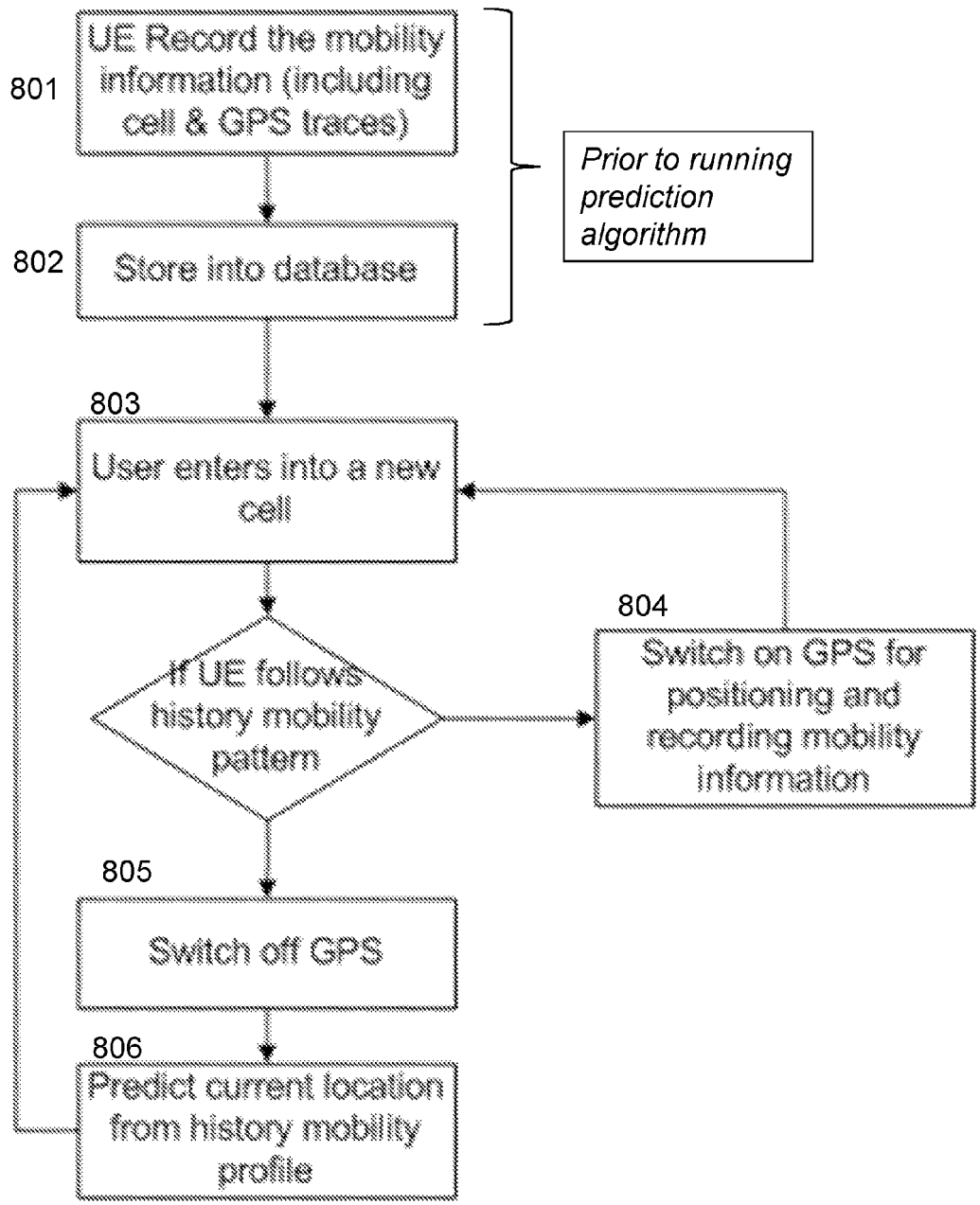
FIG. 8 is an exemplifying flowchart according to some embodiments.

In FIG. 8, a procedure for determining, by use of the positioning prediction mentioned above, a position of the wireless device 110 is described. In the following, the wireless device 110 is referred to as the UE.

Action 801

Prior to running the prediction algorithm the previously described mobility trace management is done. That is, an application or service is run in the UE to monitor the user's mobility information. The information is analysed, or processed.

Action 802

The information is stored into the database. The information could include inter-cell/intra-cell traces (or patterns), checkpoints and other information, e.g., the Markov Transition Matrix used for mobility prediction.

Action 803

Whenever the UE is entering into a new cell, it is determined if the UE follows its history mobility pattern by checking if the current cell is the predicted one in last cell. In some examples, the GPS is already turned off. The prediction can be done using an order-2 Markov model or some other method.

Action 804

If the UE does not follow its history mobility pattern, then use GPS to retrieve current location of the UE and the position is recorded. The GPS is on until the UE enters a new cell. When the current cell ID is not equal to the predicted cell ID, it may be detected that the UE does not follow its history mobility pattern.

Action 805

If the UE is following its history pattern, the appropriate intra-cell trace is identified and the UE position is aligned. The GPS receiver is switched off, or remains switched off.

Action 806

The current location is predicted from the associated, and stored, intra-cell traces. When the UE is predicted to be at a checkpoint:

Check, e.g. by means of GPS, if the UE follows the typical or an occasional route, e.g. if the UE follows the current intra-cell pattern or if the UE has switched onto an alternative intra-cell pattern.

Check if UE movement predictions need to be updated by new speed or re-alignment of the trace.

Mobility Trace Management

The trace management, or history mobility pattern management, collects and records a user's mobility and other related history information which includes geo-location, cell ID and checkpoints, routes, speed along different routes etc. It also control whether GPS receiver is enabled for positioning. It processes and stores the recorded information into the History Mobility Database with specified format. Prior to the use of the prediction algorithm, the database must be created. During this time, the GPS unit in the UE must be used in order to collect the traces. Also during the use of the prediction algorithm, the database may be updated by e.g. new traces obtained when the UE is not following its historical routes.

For example, a table could be maintained to record the cell ID sequence which is visited by the mobile user. This table is mainly used to generate the cell transition probability matrix for mobility prediction and store the Intra-cell mobility traces.

TABLE 1

Cell Trace information

| | |
|---|---|
| Cell_ID | Include both cell (tower) ID and LOC (Location Area Code) ID |
| Enter_Time | The time when the UE moves into the cell |
| Stay_Time_E | The expected sojourn time in the cell |
| Intra_Cell_Trace | A history mobility trace of the UE in this cell, it consists of a sequence of GPS coordinates. In each cell, there is one or more intra-cell traces which are identified by its neighbor cells, for example, last two cells prior to current one. As an example, x-, y-coordinates indicating longitude and latitude may be present in the intra-cell pattern, such as the intra-cell trace. The intra-cell pattern may further include z-coordinates indicating altitude. Moreover, the intra-cell pattern may include time information indicating a time trace with information about time interval between consecutive points in a location trace. The location trace may be a set of GPS-coordinates, pairs of x-, y-coordinates or the like. |
| Position_CP1 | Position of checkpoint 1. The checkpoint may be indicated by a pair of x-y-coordinates and/or a corresponding time. |
| Time_to_CP1 | The predicted time until UE reaches checkpoint 1 |

As an example the checkpoint may be indicated by a position in the mobility pattern, i.e. the position includes position information and/or time information, such as Position_CP1 and/or Time_to_CP1.

Based on the stored inter-cell traces, some prediction methods such as Order-k Markov predictor could be used to predict the next cell which the user is going to visit. Studies show that order-2 (O(2)) Markov predictor provides a good balance between the prediction accuracy and computation complexity, but other mobility prediction method could also be applied here.

Intra-Cell Traces and Checkpoint Identification

Within each cell, there is one or more intra-cell traces which can be identified by the last two cells prior to the current cell. The sampled GPS traces are processed to give a history trace (by averaging or smoothing the sampled traces). Let $G_c=(g_1, g_2, \ldots, g_i, \ldots, g_n)$ represent one history GPS trace associated with the current cell c, in which $g_i$ is the ith GPS coordinate including latitude and longitude. The corresponding history time trace of the user is given by $T_c=(t_1, t_2, \ldots, t_i, \ldots, t_n)$ representing the time intervals between the points in the GPS trace Gc.

The sampled traces are also analyzed to discover if there are any points where the traces diverge, either spatially (i.e. different routes) or temporally (i.e. different speeds). In case there are different routes, this will result in an alternative trace. As an example, assume that the majority of traces are according to $$G_c=(g_1,g_2,\ldots,g_i,g_{i+1},\ldots,g_n),$$

while some are according to $$H_c=(g_1,g_2,\ldots,g_i,h_{i+1},h_{i+1},\ldots,h_n).$$

In this case, both traces are equal up to gi, after which they diverge. In this case, the point and time $(g_i+1, t_i+1)$ is defined as a checkpoint and can be used in the prediction algorithm to determine which route the UE takes.

In a similar way, checkpoints to determine where the speed may be very different between traces can be defined (by looking at the time traces Tc). In case a checkpoint in the time trace is defined, this will lead to that the UE position should either be re-aligned at the checkpoint (in case the UE has stopped for some time) or that a new time trace should be used (if a different speed should be used). In addition, low power sensors equipped with smartphone can be used to identify such checkpoints, for example, it can be easily to determine UE's moving status or speed via accelerometer with low energy consumption.

A concluding remark about checkpoints is that a checkpoint of an intra-cell pattern may be defined in an intra-cell location trace of the intra-cell pattern and/or in an intra-cell time trace of the intra-cell pattern. Therefore, the term "junction" when used in connection with checkpoints may define a junction relating to different intra-cell location traces or a junction relating to different intra-cell time traces.

The proposed solution combines the build-in sensors (accelerometer, gyroscope, and compass) in the wireless device to train the system to learn the user's (i.e wireless device's) movement pattern (or mobility pattern) and predict the angle, e.g. movement direction, and relative location of the wireless device. Movement direction may be up, down, right, left, backwards, forwards etc.

Since the direct measure from the sensors contains noise, the direct calculation is very inaccurate and error rate can be very large.

Mobility Prediction and Pattern Matching

Mobility/position prediction includes two parts: spatial movement (predict the future location) and temporal behavior (predict when the movement to next cell will take place and how long the user will stay in that cell).

An example of how mobility prediction can be carried out using an order-2 Markov predictor is given in L. Song, D. Kotz, R. Jain, and X. He, "Evaluating location predictors with extensive wi-fi mobility data," in Proc. INFOCOM 2004, vol. 2, 2004, pp. 1414-1424.

Position Prediction

When the user is moving to a new cell, it's possible to check if this cell is the predicted one when the user was in the last cell. If the current cell is not the predicted one, i.e., the current cell is either a new cell or the user does not follow its history mobility pattern, then GPS in the mobile device shall be enabled and may be kept on until the terminal has moved out from the current cell. The current location of the UE is given by the GPS receiver. The new trace can also be added to the database. As another example, the GPS in the wireless device (mobile device) may be kept on until it is detected that a intra-cell pattern (or intra-cell trace) is followed by the wireless device.

Moreover, in other examples, it may be that the wireless device moves into a new cell, which is not the predicted cell. Instead of turning on the GPS, the wireless device may check if the new cell is comprised in a further inter-cell pattern (or inter-cell trace). The further inter-cell pattern may be an alternative inter-cell pattern, which the wireless device follows with a first level of probability. Typically, the first level of probability may be less than a second level of probability for that the wireless device follows an inter-cell patter including the predicted cell initially mentioned in this paragraph. An intra-cell pattern may then be selected for the new cell as described herein. In this manner, the wireless device may switch from one inter-cell pattern to another inter-cell pattern, for example without turning on and using the GPS functionality/unit. Thus, power consumption of the wireless device is further reduced while a sufficiently high accuracy of the predicted position is maintained.

If the current cell is the same as the predicted one, it indicates that the user is following its history mobility pattern. In this case the current position (latitude and longitude) is predicted by using the history intra-cell GPS trace associated with the current cell $G_c$ and $T_c$.

In case there are several intra-cell traces in the new cell, the previous two cells prior to the current one are used to select the appropriate trace.

At the checkpoints, the GPS receiver is turned on, and the prediction according to $G_c$ is compared to the true GPS coordinate to determine if prediction should continue according to $G_c$ and $T_c$ or if an alternative location or time trace should be used for prediction of the UEs location. Embodiment includes one or more of the following actions.

Historical UE traces saved and processed to find possible routes

Data in these routes are processed to find intervals were speed is different between travels of same route Data in these routes are processed to find junctions and/or crossings were routes diverge Define these junctions and/or crossings as checkpoints Examine difference between prediction and comparison value at checkpoints. As an example, the comparison value may be obtained by a GPS unit of the wireless device. In some example, the mobility sensors may provide information about a comparison value, indicative of a true route, i.e.

the one that the wireless device is on. The wireless device is on the true route with some degree of certainty, or probability.

Adjust prediction (route or speed) if necessary.

Figure 9:
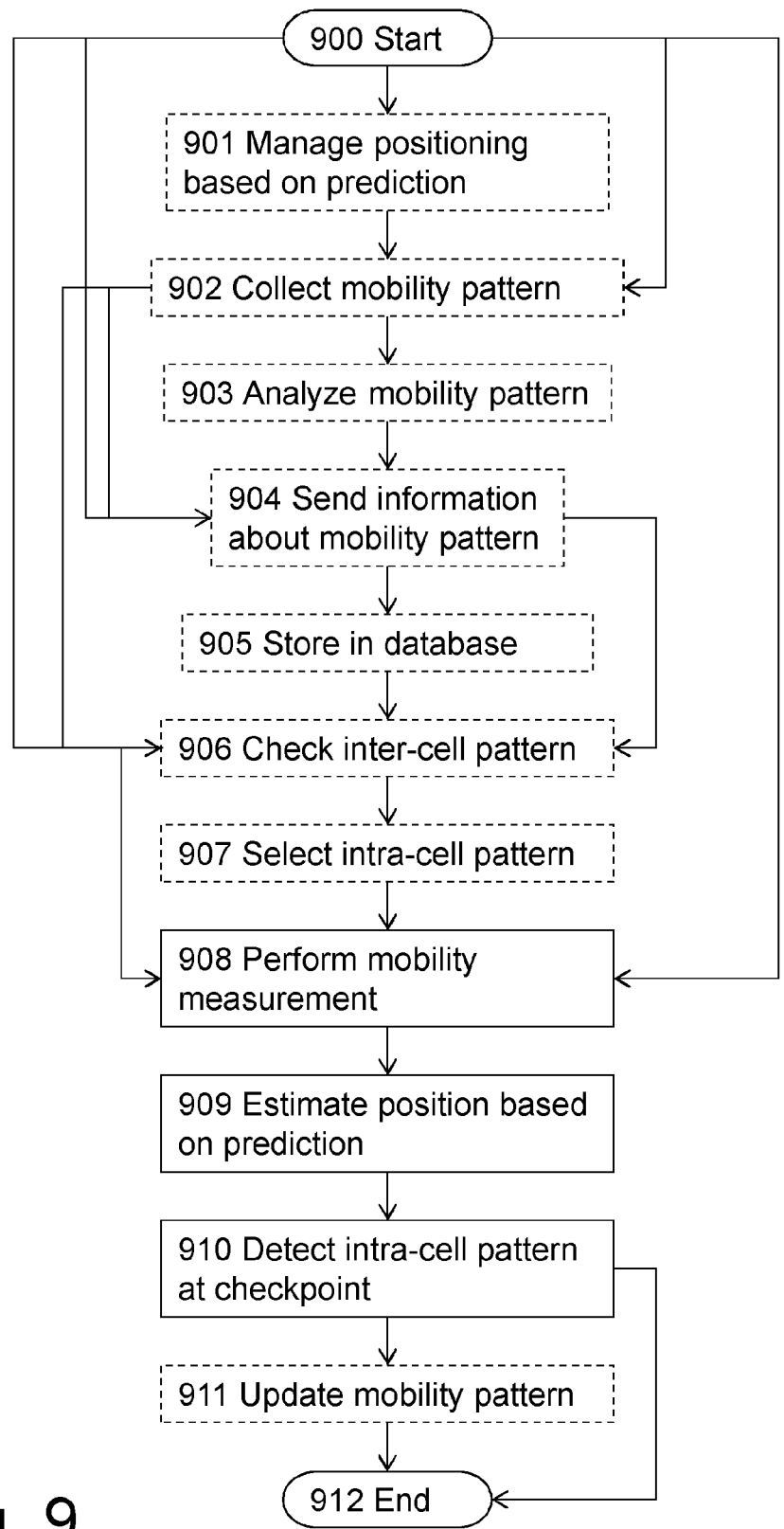
FIG. 9 is a flowchart illustrating embodiments of the method performed by the wireless device.

In FIG. 9, an exemplifying, schematic flowchart of a method in, e.g. performed by, the wireless device 110 is shown. Hence, the wireless device 110 performs a method for managing a positioning method based on prediction, which may be similar to the method in FIG. 4.

State 900

As an example, an application utilizing a location based service may be running in the wireless device 110, e.g. the application is executed by the wireless device 110. The application may require positioning information, e.g. estimates of the position of the wireless device at regular or irregular intervals, such as time interval or distance intervals. Thus, the wireless device 110 may need to provide positioning information and manage positioning based on prediction, for example in order to reduce power consumption.

The following actions may be performed in any suitable order.

Action 901

The wireless device 110 may manage a positioning method based on prediction.

Action 902

The wireless device 110 may collect mobility patterns of the wireless device by identifying inter-cell patterns and intra-cell patterns. The mobility patterns may comprise the inter-cell patterns and the intra-cell patterns. This action is similar to action 402.

Action 903

The wireless device 110 may analyze the collected mobility patterns to identify one or more checkpoints by finding one or more junctions among the intra-cell patterns. This action is similar to action 403.

Action 904

The wireless device 110 may send the collected mobility patterns to the network node 120. This action is similar to action 404.

Action 905

The wireless device 110 may store the mobility patterns in the database. This action is similar to action 405.

Action 906

The wireless device 110 may check the inter-cell pattern by comparing a first cell identifier of the target cell to a second cell identifier for a predicted subsequent cell according to the inter-cell pattern, when the wireless device enters a target cell from the source cell. The wireless device 110 follows an inter-cell pattern, which comprises a source cell. This action is similar to action 406.

Action 907

The wireless device 110 may select the intra-cell pattern based on the source cell and a further source cell, which was visited, by the wireless device 110, prior to the source cell. This action is similar to action 407.

Action 908

The wireless device 110 performs mobility measurements relating to mobility of the wireless device 110. The performing 408 of mobility measurements is performed by one or more mobility sensors and/or measurement of time elapsed since a preceding position estimation. This action is similar to action 408.

Action 909

The wireless device 110 estimates a position of the wireless device 110 based on prediction by using the mobility measurements and a first intra-cell pattern, which first intra-cell pattern indicates positions within a cell. The wireless device 110 is associated with the cell. This action is similar to action 409.

Action 910

The wireless device 110 detects whether the wireless device 110 is on the first intra-cell pattern or on the second intra-cell pattern, when the estimated position has reached a checkpoint of the first intra-cell pattern. The checkpoint identifies a junction between the first intra-cell pattern and a second intra-cell pattern for indicating positions within the cell.

The detecting may be performed by means of GPS measurements.

The detecting may be performed by means of mobility measurements performed by one or more mobility sensors.

If the estimated position has not reached the checkpoint of the first intra-cell pattern, this action is omitted. The wireless device 110 may then enter state 912 below.

This action is similar to action 410.

Action 911

The wireless device 110 may update the mobility pattern by adding the collected mobility patterns to a database comprising mobility patterns. This action is similar to action 411.

State 912

In this state, the wireless device 110 may wait a period of time before once again proceeding with for example action 908. The period of time may be predetermined or irregular depending on for example the application, utilizing the location based service.

With reference to FIG. 10, a schematic block diagram of the wireless device 110 is shown. The wireless device 110 is configured to perform the methods in FIGS. 4 and/or 9. Hence, the wireless device 110 is configured to manage a positioning method based on prediction.

The wireless device 110 comprises a processing circuit 1010 configured to perform mobility measurements relating to mobility of the wireless device 110, and to estimate a position of the wireless device 110 based on prediction by using the mobility measurements and a first intra-cell pattern, which first intra-cell pattern indicates positions within a cell. The wireless device 110 is associated with the cell.

Furthermore, the processing circuit 1010 is configured to detect whether the wireless device 110 is on the first intra-cell pattern or on the second intra-cell pattern, when the estimated position has reached a checkpoint of the first intra-cell pattern. The checkpoint identifies a junction between the first intra-cell pattern and a second intra-cell pattern for indicating positions within the cell.

The processing circuit 1010 may further be configured to perform the mobility measurements by one or more mobility sensors and/or measurement of time elapsed since a preceding position estimation.

The processing circuit 1010 may further be configured to detect by means of GPS measurements.

The processing circuit 1010 may further be configured to detect by means of mobility measurements performed by one or more mobility sensors.

In some embodiments, the wireless device 110 follows an inter-cell pattern, which comprises a source cell. The processing circuit 1010 may be configured to check the inter-cell pattern by comparing a first cell identifier of the target cell to a second cell identifier for a predicted subsequent cell according to the inter-cell pattern, when the wireless device enters a target cell from the source cell.

The processing circuit 1010 may further be configured to select the intra-cell pattern based on the source cell and a further source cell, which was visited, by the wireless device 110, prior to the source cell.

The processing circuit 1010 may further be configured to collect mobility patterns of the wireless device by identifying inter-cell patterns and intra-cell patterns. The mobility patterns comprise the inter-cell patterns and the intra-cell patterns.

The processing circuit 1010 may further be configured to analyse the collected mobility patterns to identify one or more checkpoints by finding one or more junctions among the intra-cell patterns.

The processing circuit 1010 may further be configured to update the mobility pattern by adding the collected mobility patterns to a database comprising mobility patterns.

The processing circuit 1010 may further be configured to send the collected mobility patterns to the network node 120.

The wireless device 110 further comprises a transmitter 1020, which may be configured to send one or more of the information about mobility pattern, checkpoints and other numbers, values or parameters described herein.

The wireless device 110 further comprises a receiver 1030, which may be configured to receive one or more of the information about mobility pattern, checkpoints and other numbers, values or parameters described herein.

The wireless device 110 further comprises a memory 1040 for storing software to be executed by, for example, the processing circuit. The software may comprise instructions to enable the processing circuit to perform the methods described herein. The memory may be a hard disk, a magnetic storage medium, a portable computer diskette or disc, flash memory, random access memory (RAM) or the like. Furthermore, the memory may be an internal register memory of a processor.

In some examples, the wireless device 110 may comprise a processing unit 1050, which may comprise one or more of the processing circuit 1010, the transmitter 1020, the receiver 1030 and the memory 1040.

A computer program for managing a positioning method based on prediction may be provided. The computer program comprises computer readable code units which when executed on a computer, e.g. in the form of the wireless device, causes the computer to perform the method according to FIGS. 4 and/or 9.

A computer program product, comprising computer readable medium and a computer program as directly above is provided.

Figure 11:
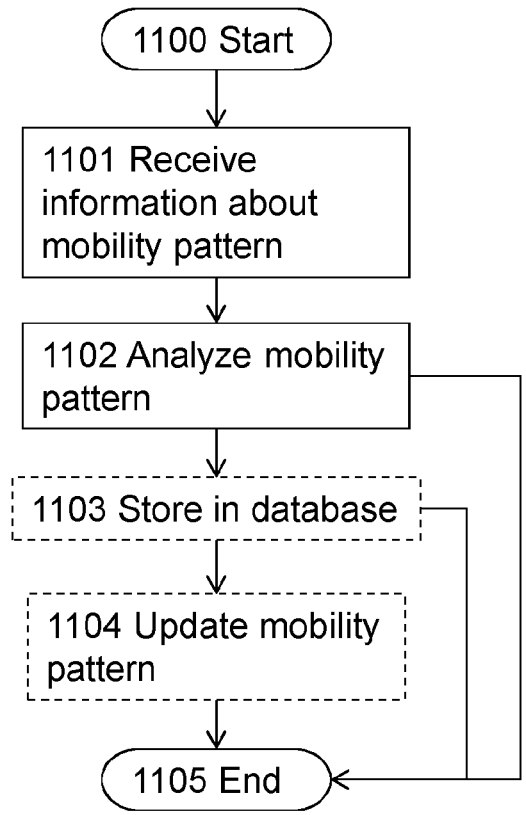
FIG. 11 is a flowchart illustrating embodiments of the method performed by the network node.

In FIG. 11, an exemplifying, schematic flowchart of the method in the network node 120 is shown. Hence, the network node 120 performs a method for managing mobility patterns for use by a wireless device 110 when performing a positioning method based on prediction.

State 1100

In this state, the network node 120 may be ready to receive information about mobility pattern. For example, the network node 120 request the wireless device 110 to collect and send mobility patterns to the network node 120.

The following actions may be performed in any suitable order.

Action 1101

The network node 120 receives information about mobility patterns. The mobility patterns comprise intra-cell patterns of cells visited by the wireless device 110. This action is similar to action 412.

Action 1102

The network node 120 analyses the mobility patterns according to the received information about mobility patterns. The analyzing comprises identifying one or more checkpoints by finding a junction between at least two of the intra-cell patterns. This action is similar to action 413.

Action 1103

The network node 120 may store the mobility patterns, including the identified checkpoints, in a database. This action is similar to action 414.

Action 1104

The network node 120 may update the mobility patterns by storing the mobility patterns in action 1103. This action is similar to action 415.

State 1105

In this state, the network node 120 may be ready to once again perform action 1101. Action 1101 may be performed at once, after sending of a request for mobility information and/or at regular or irregular time intervals.

Figure 12:
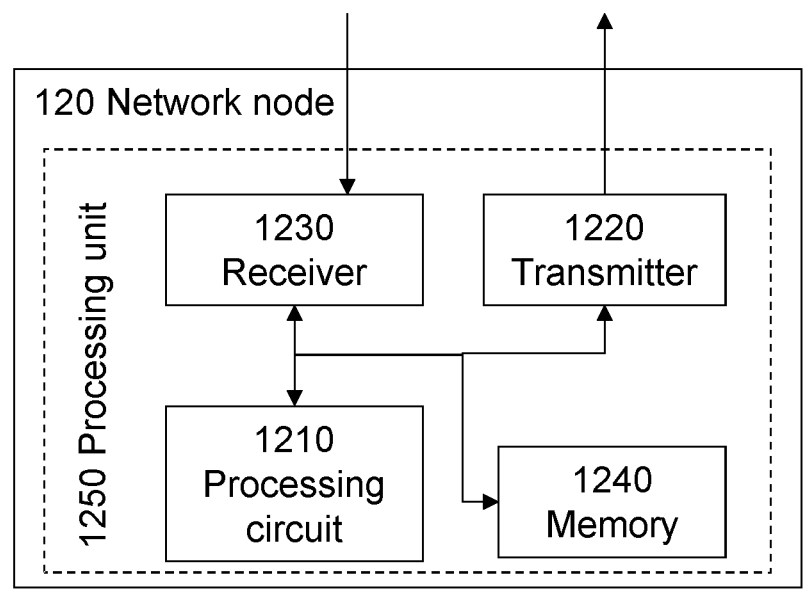
FIG. 12 is a block diagram illustrating embodiments of the network node.

With reference to FIG. 12, a schematic block diagram of the network node 120 is shown. The network node 120 is configured to perform the methods in FIGS. 4 and/or 11. Hence, the network node 120 is configured to manage mobility patterns for use by a wireless device 110 when performing a positioning method based on prediction.

The network node 120 comprises a processing circuit 1210 configured to receive information about mobility patterns. The mobility patterns comprise intra-cell patterns of cells visited by the wireless device 110. Moreover, the processing circuit 1210 is configured to analyze the mobility pattern according to the received information about mobility pattern. The analyzing comprises identifying one or more checkpoints by finding a junction between at least two the intra-cell patterns.

The processing circuit 1210 may further be configured to store the mobility pattern, including the identified checkpoints, in a database.

The network node 120 further comprises a transmitter 1220, which may be configured to send one or more of the information about mobility pattern, checkpoints and other numbers, values or parameters described herein.

The network node 120 further comprises a receiver 1230, which may be configured to receive one or more of the information about mobility pattern, checkpoints and other numbers, values or parameters described herein.

The network node 120 further comprises a memory 1240 for storing software to be executed by, for example, the processing circuit. The software may comprise instructions to enable the processing circuit to perform the methods described herein. The memory may be a hard disk, a magnetic storage medium, a portable computer diskette or disc, flash memory, random access memory (RAM) or the like. Furthermore, the memory may be an internal register memory of a processor.

In some examples, the network node 120 may comprise a processing unit 1250, which may comprise one or more of the processing circuit 1210, the transmitter 1220, the receiver 1230 and the memory 1240.

A computer program for managing a positioning method based on prediction may be provided. The computer program comprises computer readable code units which when executed on a computer, e.g. in the form of the network node, causes the computer to perform the method according to FIGS. 4 and/or 11.

A computer program product, comprising computer readable medium and a computer program as directly above is provided.

As used herein, the term "processing circuit" may be a processing unit, a processor, an application specific integrated circuit (ASIC), a field-programmable gate array (FPGA) or the like. As an example, a processor, an ASIC, an FPGA or the like may comprise one or more processor kernels, or processor cores. In some examples, the processing circuit may be embodied by a software or hardware module. Any such module may be a determining means, estimating means, capturing means, associating means, comparing means, identification means, selecting means, receiving means, transmitting means or the like as disclosed herein. As an example, the expression "means" may be a unit, such as a determining unit, selecting unit, etc.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

As used herein, the expression "transmit" and "send" are considered to be interchangeable. These expressions include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, a group of specifically addressed devices may receive and decode the transmission.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless device, for managing a positioning method based on prediction, wherein the method comprises:
   performing mobility measurements relating to mobility of the wireless device;
   estimating a position of the wireless device based on prediction by using the mobility measurements and a first intra-cell pattern, which first intra-cell pattern indicates positions within a cell, wherein the wireless device is associated with the cell; and
   when the estimated position has reached a checkpoint of the first intra-cell pattern, wherein the checkpoint identifies a junction between the first intra-cell pattern and a second intra-cell pattern for indicating positions within the cell, detecting whether the wireless device is on the first intra-cell pattern or on the second intra-cell pattern,
   wherein the wireless device follows an inter-cell pattern, which comprises a source cell, and the method further comprises:
      when the wireless device enters a target cell from the source cell, checking the inter-cell pattern by comparing a first cell identifier of the target cell to a second cell identifier for a predicted subsequent cell according to the inter-cell pattern; and
      selecting the intra-cell pattern based on the source cell and a further source cell, which was visited, by the wireless device, prior to the source cell.

2. The method according to claim 1, wherein the performing of mobility measurements is performed by one or more mobility sensors and/or measurement of time elapsed since a preceding position estimation.

3. The method according to claim 1, wherein the detecting is performed by means of GPS measurements.

4. The method according to claim 1, wherein the detecting is performed by means of mobility measurements performed by one or more mobility sensors.

5. The method according to claim 1, wherein the method further comprises:
   collecting mobility patterns of the wireless device by identifying inter-cell patterns and intra-cell patterns, wherein the mobility patterns comprise the inter-cell patterns and the intra-cell patterns.

6. The method according to claim 5, wherein the method further comprises:
   analysing the collected mobility patterns to identify one or more checkpoints by finding one or more junctions among the intra-cell patterns.

7. The method according to claim 5, wherein the method further comprises:
   updating the mobility pattern by adding the collected mobility patterns to a database comprising mobility patterns.

8. The method according to claim 5, wherein the method further comprises:
   sending the collected mobility patterns to the network node.

9. A wireless device configured to manage a positioning method based on prediction, wherein the wireless device comprises a processing circuit configured to:
   perform mobility measurements relating to mobility of the wireless device;
   estimate a position of the wireless device based on prediction by using the mobility measurements and a first intra-cell pattern, which first intra-cell pattern indicates positions within a cell, wherein the wireless device is associated with the cell; and
   when the estimated position has reached a checkpoint of the first intra-cell pattern, wherein the checkpoint identifies a junction between the first intra-cell pattern and a second intra-cell pattern for indicating positions within the cell, detect whether the wireless device is on the first intra-cell pattern or on the second intra-cell pattern;
   wherein the wireless device follows an inter-cell pattern, which comprises a source cell, and the processing circuit is configured to:
      check the inter-cell pattern by comparing a first cell identifier of the target cell to a second cell identifier for a predicted subsequent cell according to the inter-cell pattern, when the wireless device enters a target cell from the source cell; and
      select the intra-cell pattern based on the source cell and a further source cell, which was visited, by the wireless device, prior to the source cell.

10. The wireless device according to claim 9, wherein the processing circuit is configured to perform the mobility measurements by one or more mobility sensors and/or measurement of time elapsed since a preceding position estimation.

11. The wireless device according to claim 9, wherein the processing circuit (1010) is configured to detect by means of GPS measurements.

12. The wireless device according to claim 9, wherein the processing circuit is configured to detect by means of mobility measurements performed by one or more mobility sensors.

13. The wireless device according to claim 9, wherein the processing circuit is configured to collect mobility patterns of the wireless device by identifying inter-cell patterns and intra-cell patterns, wherein the mobility patterns comprise the inter-cell patterns and the intra-cell patterns.

14. The wireless device according to claim 13, wherein the processing circuit is configured to analyse the collected mobility patterns to identify one or more checkpoints by finding one or more junctions among the intra-cell patterns.

15. The wireless device according to claim 13, wherein the processing circuit is configured to update the mobility pattern by adding the collected mobility patterns to a database comprising mobility patterns.

16. The wireless device according to claim 13, wherein the processing circuit is configured to send the collected mobility patterns to the network node.

\* \* \* \* \*